UNITED STATES PATENT OFFICE 2,419,354

PRESERVATION OF SYNTHETIC RUBBER

Louis H. Howland, Waterbury, and Byron A. Hunter, Naugatuck, Conn., assignors to United States Rubber Company, New York, N. Y., a corporation of New Jersey No Drawing. Application November 25, 1944, Serial No. 565,195

5 Claims. (Cl. 260—84.5)

This invention relates to the preservation of synthetic rubber-like (elastomeric) materials, and more particularly those derived from the modified 1,3-diene polymers which are formed from the polymerization of conjugated dienes with compounds of the structure

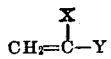

where X is hydrogen; and Y is CN, or phenyl which includes especially those butadienoid polymers known to the trade as Buna S (GRS), Buna N (GRN), Chemigum, Hycar OR, etc.

An object of the invention is to provide chemicals which, although having practically no value as antioxidants for natural rubber, nevertheless will outstandingly preserve said synthetic rubber-like materials, and particularly those derived from 1,3-dienes, against deterioration induced before vulcanization, by oxygen, heat, or light. A further object is to provide a class of compounds which may be added to white or light-colored synthetic rubber stocks without producing bad discoloration when the compositions containing them are exposed to the action of sunlight. A still further object is to provide chemicals which protect the unvulcanized diene-vinyl compound co-polymers against the deleterious effects of heat when such polymers are subjected to elevated temperatures during processing. Another object is to provide chemicals which have special and outstanding properties in connection with the preservation of diene-vinyl compound copolymers. Still other objects will be apparent from the following description.

We have found that these objects may be attained if there is incorporated into the synthetic rubber an organic ester of phosphorous acid having the formula

where R₁, R₂, and R₃ are alike and represent an aryl radical.

Exemplary of such chemicals are: triphenyl phosphite, tri-o-tolyl phosphite, tri-m-tolyl phosphite, tri-p-tolyl phosphite, tri-xenyl phosphite, tri-beta-naphthyl phosphite, tri-alpha-naphthyl phosphite, tri (p-isopropyl phenyl) phosphite, tri (p-tertiary butyl phenyl) phosphite, tri (p-tertiary amyl phenyl) phosphite, tri (p-phenoxy phenyl) phosphite, tri (p-benzyloxy phenyl) phosphite, tri (p-chlorophenyl) phosphite, tri (4-methyl 2,6-di-tertiary butyl phenyl) phosphite, tri (3-methyl-4,6-di-tertiary butyl phenyl) phosphite, tri (3,5 dimethyl phenyl) phosphite, tri (2,4 dimethyl phenyl) phosphite, tri (3,4 dimethyl phenyl) phosphite, tri (2,5 dimethyl phenyl) phosphite, tri (2,4,6 tri tertiary butyl phenyl) phosphite, and tri (2 methyl-4,6 di tertiary butyl phenyl) phosphite.

The chemicals of this invention may be made by any method known to the art. A convenient method for preparing the symmetrical aryl phosphites is by the reaction of 1 mole of phosphorus trichloride on three moles of the appropriate phenol until the evolution of hydrogen chloride is complete.

The various synthetic elastomers are known by the art to be produced in various manners, including those shown in U. S. Patents Nos. 1,973,000 and 1,938,731. The present invention, however, is not concerned with the particulars of producing these elastomers but in their preservation, as aforesaid.

For the purpose of illustrating the best modes of the invention, examples of a 1,3-butadiene-styrene copolymer (GRS) containing organic esters of phosphorus acid are given for showing the beneficial protective effects to be obtained from the use of such chemicals, during hot milling, before compounding and curing.

Example 1

Unstabilized butadiene-styrene copolymer was mixed with organic phosphites as follows: The indicated amounts represent parts by weight:

|  | A | B | C | D | E |
|---|---|---|---|---|---|
| Unstabilized butadiene-styrene copolymer (GRS) | 100 | 100 | 100 | 100 | 100 |
| Triphenyl phosphite |  | 2.0 |  |  |  |
| Trinaphthyl phosphite |  |  | 2.0 |  |  |
| Tri-(p-tertiary amyl phenyl phosphite |  |  |  | 2.0 |  |
| Trixenyl phosphite |  |  |  |  | 2.0 |

The chemicals were added to the copolymer and thoroughly mixed on a rubber mill in the usual manner. The stocks were placed in an oven at 212° F. for 24 hours and were then examined. The surface of stock A, containing no added chemical, was resinified and cracked easily on bending, whereas stocks B through E were all still in good condition and showed no evidence of deterioration. All samples were replaced in the oven and examined daily for a period of 10 days. Stock A became increasingly harder and more brittle and finally was no longer rubber-like. Stocks B through E were all still in good condition, each retaining the appearance of the original unaged copolymer.

Example 2

A white synthetic rubber master batch was made up according to the following recipe:

| | |
|---|---|
| Unstabilized butadiene-styrene copolymer (GRS) | 100.0 |
| Zinc oxide | 10.0 |
| Lithopone | 50.0 |
| Kalvan (whiting) | 75.0 |
| Paraffin oil | 5.0 |
| Sulfur | 2.0 |
| Mercaptobenzothiazole | 2.0 |
| Tetramethyl thiuram monosulfide | 0.1 |
| | 244.1 |

Portions of this white stock were mixed on a rubber mill in the usual manner with a number of organic phosphites as indicated in the following table:

| | J | K | L | M | N |
|---|---|---|---|---|---|
| Master Batch | 244.1 | 244.1 | 244.1 | 244.1 | 244.1 |
| Triphenyl phosphite | | 2.0 | | | |
| Trinaphthyl phosphite | | | 2.0 | | |
| Tri-(p-tertiary amyl phenyl) phosphite | | | | 2.0 | |
| Trixenyl phosphite | | | | | 2.0 |

All stocks were placed in molds and cured for 90 minutes at 45 lbs. steam pressure. The samples of the resulting stocks were mounted for exposure to the action of sunlight. Strips of lacquered tape and of cotton cloth were placed across portions of the exposed surfaces and the samples were exposed to the action of sunlight (under glass) for 5 days. Each of the stocks showed little or no discoloration after this treatment and the strips of lacquered tape and cotton cloth were not visibly affected. Thus, it is shown that these deterioration inhibitors are non-discoloring and non-staining, and are suitable for use in either white or light-colored stocks.

It can be seen from these results that the compounds of this invention are extremely effective in overcoming the deterioration of diene-vinyl compound copolymers due to heat and oxidation. Furthermore, these results show that these deterioration inhibitors are essentially non-discoloring to white or light-colored stocks and are thereby suitable for use in either white or light-colored synthetic rubber articles although they may be used in any color and type of rubber article.

The deterioration inhibitors of this invention may be used alone in the synthetic rubber composition or may be mixed with other preservatives, fillers, accelerators, vulcanizing agents, or compounding agents of any sort known to the art. The components of the synthetic rubber composition may be used in various ratios and it is not intended to limit the invention to the amounts of ingredients indicated in the examples given.

The age resistors of the invention may be incorporated into the synthetic rubber by milling or similar process, or by mixing with the synthetic rubber latex before or during coagulation, or application thereof may be made to the surface of the crude polymer or of the vulcanized product. The amount of the age resistor may vary, economical proportions ranging from 0.25 part to 5.0 parts by weight, based on 100 parts by weight of the elastomer base.

Synthetic rubber goods of various descriptions may have their useful life prolonged by the practice of this invention including tubes, hose, wire, insulation, boots and shoes, surgical instruments, drug sundries, dipped synthetic rubber articles, vehicle tires, etc.

Having thus described our invention, what we claim and desire to protect by Letters Patent is:

1. An elastomeric polymerization product of 1,3-butadiene with a compound of the structure $$CH_2=\overset{X}{\underset{}{C}}-Y$$

where X is hydrogen and Y is a radical selected from the class consisting of CN and phenyl, which comprises a compound having the general formula

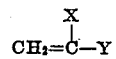

where $R_1$, $R_2$, and $R_3$ are alike and represent an aryl radical, in an amount sufficient to preserve said polymerization product.

2. An elastomeric 1,3-butadiene-styrene copolymer which comprises a compound having the general formula

where $R_1$, $R_2$, and $R_3$ are alike and represent an aryl radical, in an amount sufficient to preserve said copolymer.

3. An elastomeric 1,3-butadiene-acrylonitrile copolymer which comprises a compound having the general formula

where $R_1$, $R_2$, and $R_3$ are alike and represent an aryl radical, in an amount sufficient to preserve said copolymer.

4. An elastomeric 1,3-butadiene-styrene copolymer which comprises triphenyl phosphite, in an amount sufficient to preserve the copolymer.

5. An elastomeric 1,3-butadiene-acrylonitrile which comprises triphenyl phosphite, in an amount sufficient to preserve the copolymer.

LOUIS H. HOWLAND.
BYRON A. HUNTER.

REFERENCES CITED

The following references are of record in the file of this patent:

UNITED STATES PATENTS

| Number | Name | Date |
|---|---|---|
| 2,232,421 | Workman | Feb. 18, 1941 |
| 1,976,359 | Murray | Oct. 9, 1934 |